United States Patent
Stewart et al.

[11] Patent Number: 5,890,684
[45] Date of Patent: Apr. 6, 1999

[54] ELECTRICAL CONNECTOR APPARATUS AND METHOD FOR STRANDED CABLE

[76] Inventors: Troy Duncan Stewart, 19587 Somerset Drive, Pitt Meadows, British Columbia, Canada, V3Y 2L4; Anton Opsetmoen, 1516 Martin Street, Port Coquitlam, British Columbia, Canada, V3C 3V4

[21] Appl. No.: 823,108

[22] Filed: Mar. 24, 1997

[51] Int. Cl.⁶ ........................................ F16L 3/22
[52] U.S. Cl. ........................ 248/68.1; 174/40 CC; 403/248
[58] Field of Search .................. 248/65, 68.1, 73, 248/74; 174/40 CC, 44, 84 C; 403/248, 255, 254; 24/136 R, 135 M

[56] References Cited

U.S. PATENT DOCUMENTS

| | | |
|---|---|---|
| 1,936,009 | 11/1933 | Cummins . |
| 1,953,290 | 4/1934 | Daniel .................. 403/374 |
| 3,600,765 | 8/1971 | Rovinsky et al. .......... 24/122.6 |
| 3,605,202 | 9/1971 | De Valenzuela .......... 24/122.6 |
| 3,822,442 | 7/1974 | Herbschleb et al. ....... 24/122.6 |
| 3,952,377 | 4/1976 | Morell .................. 24/136 R |
| 3,975,799 | 8/1976 | Kerr .................... 24/122.6 |
| 4,367,568 | 1/1983 | Weiser .................. 24/122.6 |
| 4,454,633 | 6/1984 | de la Fuente et al. ..... 24/115 R |
| 4,459,722 | 7/1984 | Dziedzic et al. ......... 24/122.6 |
| 4,507,008 | 3/1985 | Adl et al. .............. 403/275 |
| 4,628,649 | 12/1986 | Jartoux ................. 52/223 L |
| 4,744,691 | 5/1988 | Thal .................... 403/374 |
| 4,912,815 | 4/1990 | Jenkins ................. 24/122.3 |
| 5,018,251 | 5/1991 | Brown ................... 24/122.6 |
| 5,233,730 | 8/1993 | Milne et al. ............ 24/136 R |
| 5,308,026 | 5/1994 | Shaw . | |

*Primary Examiner*—Ramon O. Ramirez
*Attorney, Agent, or Firm*—Kolisch Hartwell Dickinson McCormack & Heuser

[57] ABSTRACT

An apparatus and method for securing a stranded cable to an object involves passing a first end portion of the cable through an opening defined by a wall of the member, by moving the first end portion in a direction toward the connector member. A spreader member formed of a material operable to plastically deform, is placed between strands of the cable to spread apart at least some of the strands of the cable and the cable end portion and the spreader member are forced into the opening until the spreader member and at least some of the cable strands are plastically deformed.

9 Claims, 6 Drawing Sheets

ELECTRICAL CONNECTOR APPARATUS AND METHOD FOR STRANDED CABLE

BACKGROUND OF THE INVENTION

This invention relates to stranded high electric current cable connectors for securing a coarse stranded cable to an object.

In a power distribution substation, it is common to have exposed cables with coarse strands (larger than 3 mm strand diameter, aluminium or 2 mm hard drawn copper) to provide for transmission of high continuous currents or transient fault currents.

An interface between the cable and the connector must therefore withstand continuous currents, which can present temperature problems, and must withstand transient fault currents which can create significant forces which increase in proportion to the square of the current.

Such an interface will ideally serve without deterioration for the life of the substation (40 years) must be reliable, removable, easy to apply, reusable and of lowest costs.

Various connection methods have been developed over the years and are presently in use, but with time and increased loading (higher currents) conventional connection methods have been found to be less robust than anticipated.

The most common connector for large stranded cables employs a bolted clamp type connection. The main deficiency of this connection method has been the loss, over time, of clamping pressure (relaxation) which is accelerated by thermal cycling. The pressure exerted on individual cable strands breaks the high resistance surface oxide at the cable/connector interface and strand to strand interface, due to material deformation. Thus, the higher the contact pressure the more oxide is destroyed resulting in a greater conductive area, resulting in an improved connection.

Another type of connector employs a permanently compressed (crimped) sleeve type connector. This is similar to the above described arrangement, however, the cable end is placed in a sleeve which is permanently crimped in place on the cable end. This achieves better exertion of pressure on the cable, though the exerted pressure is not omnidirectional and is limited in application area. Also, the connector is not reusable.

Another, less common connection method is achieved by welding an aluminum cable end into an aluminum connector. This results in a solid metallic connection between each cable strand and the connector. The disadvantage of this connector is that specialized welders are required to make the connection and again the connector is not reusable.

For bolted cable connections it appears the main mechanical cause of clamping relaxation is slow material deformation of the cable strands at pressure points between the strands. Then, a slow deformation of the clamp itself becomes a problem together with the bolts and their resting surfaces. Deformation is enhanced by airspace between the individual cable strands, which allow room for the conductor material to flow. Over time, the pressure points are enlarged and the relaxation decreases exponentially. This relaxation effect of the contact pressure between the connector takes place in most compressed cable connections, however, it is a slow process.

Another cause of clamping relaxation results from uneven forces created in a bolted clamp. As the pressure on the clamped cable end is not omnidirectional, the individual cable strands will migrate and become repositioned until an omnidirectional pressure is achieved. This process is faster than material deformation mentioned above and after only a few days results in a noticeable relaxation of clamping pressure.

Electrically caused losses of clamping pressure are created by uneven current sharing of the individual cable strands within the clamped space. Usually, only one half portion of a connector carries the bulk of the current so the strands pressing against an inside clamp surface of the clamp experience the highest current. This results in an elevated temperature which softens the strands allowing the strand material to flow into neighbouring airspace with the resultant mechanical relaxation. Thus, a connector might perform adequately for many years until a damaging current is reached.

Natural temperature cycling causes a contraction and expansion of the cable and connector materials. This, together with an electric current, accelerates relaxation, as current carrying micro contact areas (pressure points) within the clamp are opened, and then closed again, allowing high resistance oxides to form, increasing electrical resistance. This in turn creates a higher temperature and increased material flow leading to further contact pressure reduction, increased micro contact breakage and so on. This effect is known as "thermal runaway". Eventually, the clamping pressure on conventional connectors is no longer able to hold the cable in place during a fault, or the above thermal runaway condition catastrophically melts and burns the connection during a period of high current flow.

What would be desirable, therefore, is to have a simple, inexpensive, easy to install, reusable and robust connector that completely surrounds the cable end with a high uniform omnidirectional pressure and with a minimum electrical resistance.

The present invention addresses this need.

BRIEF SUMMARY OF THE INVENTION

In accordance with one aspect of the invention, there is provided a connector apparatus for securing a stranded cable to an object. The apparatus includes a member operable to be secured to the object and having a wall defining an opening for receiving a first end portion of the cable. The apparatus further includes a spreader operable to be received between strands of the cable and being formed of a material operable to plastically deform when forced into the opening with the first end portion of the cable.

Preferably, the spreader is dimensioned to spread at least some of the strands until at least some of the strands are plastically deformed against the wall as the first end portion and the spreader are forced into the opening.

Preferably, the opening defines a connector opening volume and a portion of the first cable end portion within the opening defines a cable volume, and a difference between the connector opening volume and the cable volume is defined as a difference volume. Preferably the spreader defines a spreader volume, the spreader being dimensioned such that the spreader volume is between approximately five percent and approximately ten percent greater than the difference volume.

The spreader may include an elongated member. Preferably, the elongated member has a tapered wedge portion operable to be received in interstices between strands of the cable. Preferably, the wall defining the opening has a tapered wall portion and preferably, the elongated member has a tapered wedge portion having a taper complementary to the tapered wall portion.

Preferably, the spreader includes a plurality of elongated members, each of the elongated members having a tapered wedge portion operable to be received in a respective interstice between strands of the cable.

The spreader may include a generally annular member operable to be received between strands of the cable and the annular member may include a tubular member operable to be received on at least one strand of the cable. Or, when a relatively large multi-stranded cable is used the tubular member may be operable to be received between first and second outer layers of strands of the cable. When the annular member is used, preferably, the wall has a tapered wall portion and preferably, the annular member has a taper complementary to the tapered wall portion.

The spreader may include a plurality of arcuate members operable to be received between first and second outer layers of strands of the cable.

In accordance with another aspect of the invention, there is provided a connector apparatus for securing a stranded cable to a member having a wall defining an opening for receiving a first end portion of the cable, the opening having a diameter approximately equal to the diameter of the cable. The apparatus includes a spreader member operable to be received between strands of the cable, the member being formed of a material operable to plastically deform when pressed into the opening with the first end portion of the cable.

The spreader member may include an elongated member and preferably, the elongated member has a tapered portion operable to be received in interstices between strands of the cable.

The spreader member may include an annular member and preferably the annular member has a tapered portion. Alternatively, the annular member may include a tubular member.

The spreader member may include an arcuate member.

Preferably, the spreader member is dimensioned such that at least some of the strands of the cable are plastically deformed against the wall.

In accordance with another aspect of the invention, there is provided a method for securing a stranded cable to a member. The method includes the steps of:

a) passing a first end portion of the cable through an opening defined by a wall of the member, by moving the first end portion in a direction toward the connector member; and b) placing a spreader member formed of a material operable to plastically deform, between strands of the cable to spread apart at least some of the strands of the cable;

c) forcing into the opening the cable end portion and the spreader member, until the spreader member and at least some of the cable strands are plastically deformed.

Preferably the step of forcing includes the step of forcing the cable end portion and the spreader member into the opening in a direction opposite to the direction in which the cable end portion is passed through the opening.

The step of forcing may include the step of pressing the cable end portion and the spreader member with a press.

The step of placing may include the step of placing a plurality of elongated members in respective interstices between strands, generally parallel to the axis of the cable.

BRIEF DESCRIPTION OF THE SEVERAL VIEWS OF THE DRAWING

In drawings which illustrate embodiments of the invention.

DETAILED DESCRIPTION OF THE INVENTION

Figure 1:
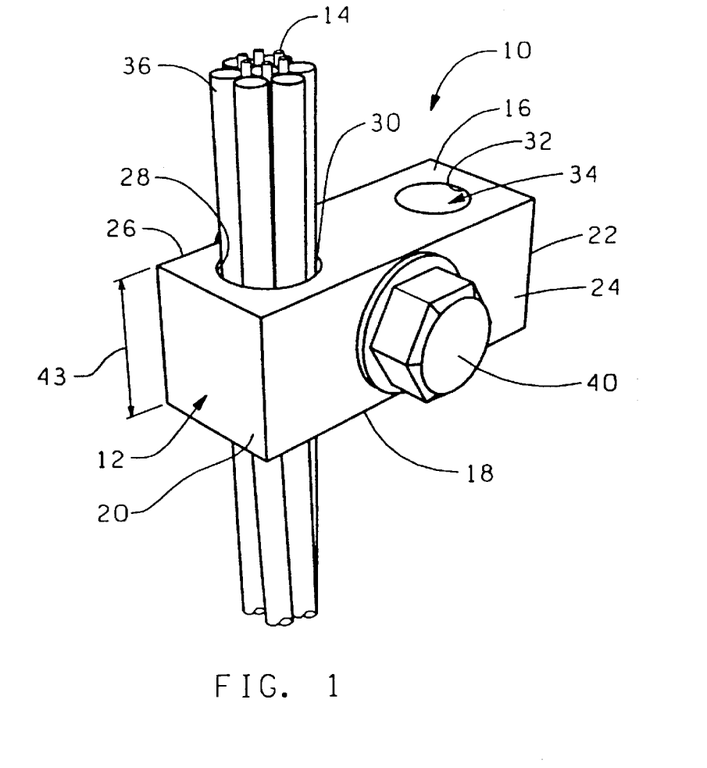
FIG. 1 is an oblique view of an apparatus according to a first embodiment of the invention, shown in operative relationship with a relatively small diameter stranded cable.

Referring to FIG. 1, a connector apparatus for securing a stranded cable to an object, according to a first embodiment of the invention is shown generally at 10. The apparatus includes a connector member 12 and a plurality of elongated members 14.

The connector member 12 is formed from aluminum and has a generally rectangular parallelepiped shape having first and second opposite major faces 16 and 18, first and second opposite end faces 20 and 22, and first and second opposite side faces 24 and 26.

The connector member 12, has a first circular wall 28 defining a passageway or generally circularly shaped opening 30 extending between the first and second opposite major faces 16 and 18. The connector member 12 has a similar second circular wall 32 defining an opening 34, also extending between the first and second opposite major faces 16 and 18. The first and second openings 30 and 34 are operable to receive respective end portions of respective cables, only one of such end portions being shown at 36 extending through the opening 30. It will be appreciated that a further end portion may be inserted through the opening 34.

Figure 2:
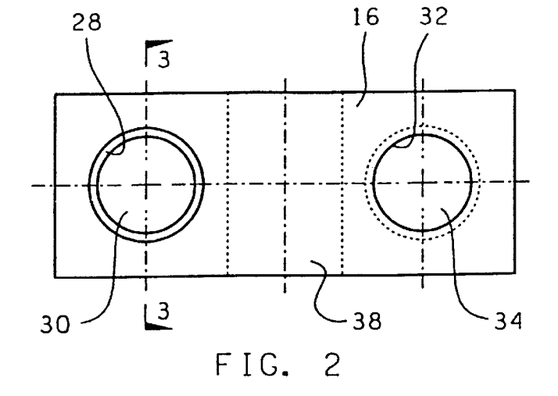
FIG. 2 is a plan view of a connector member according to the first embodiment of the invention.

Referring to FIG. 2, the member has a third opening 38 which is operable to receive a bolt, seen best in FIG. 1 at 40, for securing the member to an object, such as a structural tower member (not shown) in an electrical transmission substation. Referring back to FIG. 2, it will be appreciated that the openings 30 and 34 are intended to receive respective end portions of cables and are entirely independent of the third opening 38 used to receive the bolt to secure the member to an object. Thus, securing the member to the object and securing the cable end portions to the member are independent of each other.

Figure 3:
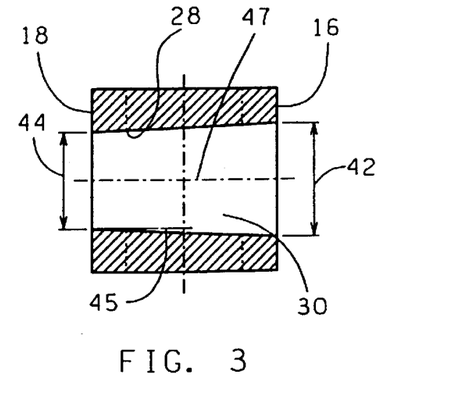
FIG. 3 is a sectional view taken along line 3—3 of FIG. 2.

Referring to FIGS. 2 and 3, the wall 28 defining the opening 30 has a first diameter 42 at the first major face 16 and has a second, lesser diameter 44 at the second major face 18. Thus, the wall 28 is disposed at an angle 45 to the axis 47 of the opening, which in this embodiment is between approximately 2.5 to approximately 5 degrees. Thus, the wall acts as a tapered wall portion extending between the first and second opposite major faces 16 and 18 and the cross-sectional area of the opening gradually decreases from the first major face 16 to the second major face 18. In this embodiment, the apparatus is intended to be used with a 4/0 seven strand bare copper cable, which has an outer diameter of approximately 17/32 inches, therefore, the first diameter 42 measures 5/8 inches in diameter while the second diameter measures 17/32 inches. Therefore, the opening has a truncated conical shape having a cross-sectional area approximately equal to the cross-sectional area of the cable and defines a connector opening volume within which a cable end portion may be placed. The connector member 12 has a thickness 43 defined as the distance between the first and second major faces 16 and 18, which in this embodiment is one inch.

Referring back to FIG. 2, the second wall 32 is similar to the first wall 28 and, therefore, is operable to receive an end portion of a similar 4/0 7 strand bare copper cable. However, the taper is opposite to the taper of the first wall 28 in that the diameter at the second major face 18 has the same dimension as diameter 42, ie., 5/8 inches and the diameter at the first major face 16, has the same dimension as diameter 44, ie., 17/32 inches. This allows cable ends to be fastened to the connector member 12 in either of two opposite orientations.

Figure 4:
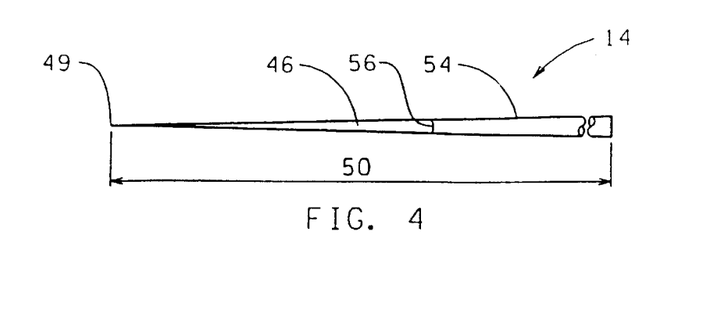
FIG. 4 is a side view of an elongated member according to the first embodiment of the invention.

Referring to FIG. 4, an elongated member according to the first embodiment of the invention is shown generally at 14. The elongated member has a tapered shaft or wedge portion 46 with a generally circular cross-section having a diameter of about 40–60 percent or preferably about ½ the diameter of the cable strand at its greatest diameter, and tapers to a point 49. The tapered shaft portion has a length 50 equivalent to the distance between the first and second major faces 16 and 18, in this embodiment, one inch. The shaft portion is tapered complimentary to the taper of the first wall 28 shown in FIG. 3 at an angle 56 approximately equal to the angle 45 shown in FIG. 3, ie., approximately 5 degrees. Thus, the shaft portion is tapered in a manner complementary to the taper of the first wall 28.

In this embodiment, the elongated members are formed from copper due to its ability to plastically deform. Generally the elongated members may be formed from any conductive material capable of plastic deformation. It is also desirable however, to form the elongated members of a material compatible with the material of the conductor strands so as to avoid corrosion. It is preferable to employ elongated members formed of the same material as the strands of the cable to avoid corrosion and because such material will have the same coefficient of expansion as the cable strands.

Operation

Figure 5:
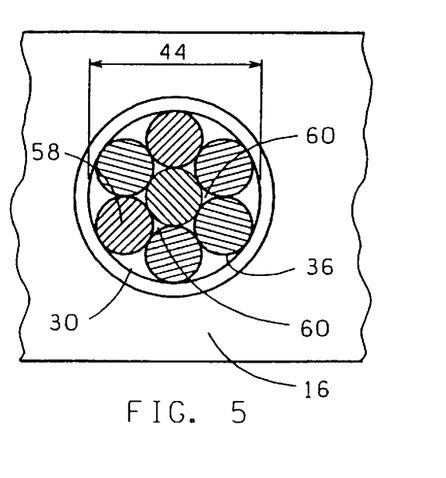
FIG. 5 is a fragmented plan view of the connector member of FIG. 1, immediately upon insertion of the cable end portion into the connector member.
Figure 6:
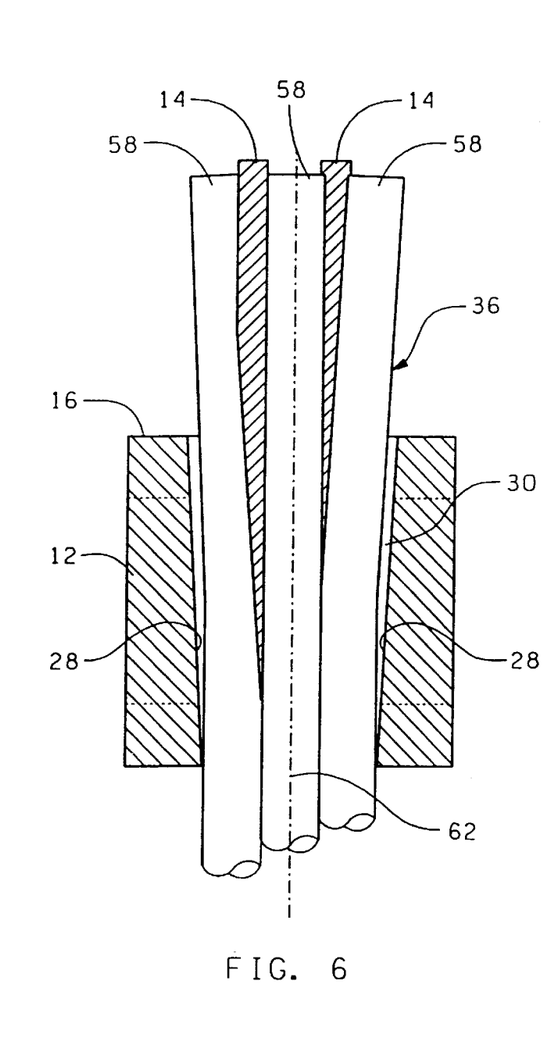
FIG. 6 is a sectional view taken along line 6—6 of FIG. 7.

Referring to FIG. 5, in use, the cable end portion 36 is inserted into the opening 30 from the side of the second major face 18 (not shown in FIG. 5). In other words, the cable end is inserted at the portion of the opening 30 having the smallest diameter and extends through the opening to project beyond the first major face 16, as shown in FIG. 6. Thus a first end portion of the cable is passed through an opening defined by a wall of the member, by moving the first end portion in a direction toward the connector member.

Referring to FIG. 5, during insertion of the cable, it will be appreciated that the individual cable strands 58 are tightly compacted together. This will be necessary because the outer diameter of the cable end is approximately equal to the second diameter 44. In this configuration, interstices 60 between adjacent cable strands are relatively small. Thus it will be appreciated that the connector member 12 has a wall defining an opening for receiving a first end portion of the cable, the member being operable to be secured to an object.

Referring to FIG. 6, with the cable end portion 36 extending through the opening 30, the cable strands 58 are slightly spread apart by hand to enable the insertion of a plurality of elongated members 14 into respective interstices (60 in FIG. 5). The tapered wedge portions of the elongated members assist in enabling the elongated members to be received in interstices between strands of the cable, although the invention will still work if the spreader members are not tapered. The placement of the elongated spreader members in this manner securely holds them in place. Thus, spreader members formed of a material operable to plastically deform are placed, generally parallel to the axis of the cable, between strands of the cable to spread apart at least some of the strands of the cable.

Figure 7:
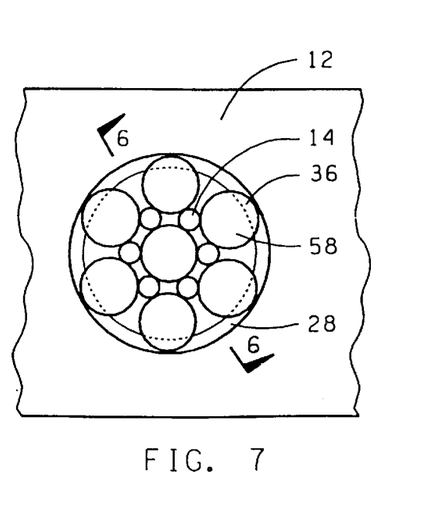
FIG. 7 is a fragmented plan view of the connector member of FIG. 1 shown with spreader members according to the first embodiment inserted between strands of the cable.

With the elongated members 14 so inserted, a hammer, (not shown) is used to drive the cable end portions together with the elongated members 14 into the opening 30 in a direction parallel with the axis 62 of the cable end portion 36. As the diameter of the elongated members is about 40–60 percent or preferably about approximately 50 percent of the diameter of the cable strands, the driving of the cable end portion 36 and elongated members has the effect of spreading the strands of the cable such that at least some of the strands are forced against the wall 28, seen best in FIG. 7. The dimensions of the elongated members relative to the cable, the cable strands and the diameters of the opening 30 cause plastic deformation of the spreader member and plastic deformation of the cable strands 58 against the wall 28 as the cable end portion is forced into the opening. Thus, the cable end portion and the spreader member are forced into the opening until the spreader member and at least some of the cable strands are plastically deformed. The cable end portion 36 is thus tightly secured to the connector member 12.

Referring to FIG. 6, as the volume of the connector opening is slightly larger than the volume occupies by the cable strands within the connector opening, to achieve clamping the difference in these volumes must be filled by the material of elongated members to achieve holding of the cable. The amount of holding is increased by placing more material or longer elongated members in the interstices between cable strands. It has been found that suitable holding forces can be achieved by using separate spreader members in respective interstices and by selecting spreader members with tapered portions, having a taper, length and maximum and minimum diameters such that the total volume occupied by the spreader members is approximately 5 percent to approximately 10 percent greater than the difference in volumes of the connector opening and cable portion in the connector opening. Thus, the opening defines a connector opening volume and a portion of the first cable end portion within the opening defines a cable volume. A difference volume may be defined as the difference between the connector opening volume and the cable volume and a spreader volume may be defined as the volume occupied by the spreaders members, collectively. The required clamping pressure may be obtained if the spreaders are dimensioned such that the spreader volume is between approximately five percent and approximately ten percent greater than the difference volume.

The act of driving the cable end portion 36 together with the elongated members 14 generally prevents collapse of the spreader members, as would otherwise occur if attempts were made to drive the spreader members into the interstices alone, while the cable end portion is held stationary. The technique of driving both the cable end portion and the spreader members allows the spreader members to be made of relatively soft, plastically deformable material. Thus, the spreader member material can more easily flow between the strands to fill the interstices. Generally, the spreader members should be made of a material no harder than the material of cable to achieve the desired plastic deformation effect. Thus, the spreader member acts as a spreader operable to be received between strands of the cable and being formed of a material operable to plastically deform when forced into the opening with the first end portion of the cable. It will be appreciated that the spreader is dimensioned to spread at least some of the strands until at least some of the strands are plastically deformed against the wall as the first end portion and the spreader are forced into the opening, in a direction opposite to the direction in which the cable end portion is passed through the opening.

While the taper of the opening 30 is preferably between 2.5 and 5 degrees, generally, the taper is used to cooperate with the spreader members to create enough friction between the connector member and the cable end portion to resist pushback forces of at least 5 percent of the rated cable strength while at the same time minimizing strand collapse during forcing of the end portion back into the opening.

In addition, the driving of the cable end portion and spreader members causes outside strands of the cable to be rubbed against the wall 28, which has the effect of removing any oxide in the electrical interface between the cable strands and the wall 28. In addition, the plastic deformation of the spreader members between the strands further removes oxides. This reduces the resistance between the cable strands and the connector member 12, reducing any heating due to fault currents or other currents which may be flowing between the cable and the connector member 12, resulting in a cooler connector. By reducing resistance in this manner, thermal expansion and contraction which would otherwise occur due to heating and cooling of the connector member 12 is reduced. Such expansion and contraction could otherwise cause the cable to become loosened in the connector member 12. These effects are, however, minimized due to the removal of oxide from the connectors during the connection process. The removal of oxide in this manner is particularly useful when aluminum cables are used, as aluminum usually has a thin oxide layer which develops quite quickly. This oxide layer must be removed to create an effective connection. In addition, plastic deformation occurs along the entire region of the cable which is captured within the opening rendering the entire inside wall surface of the opening active in electrical conduction and active in clamping. Thus electrical load is carried uniformly throughout the entire surface of the inside wall and clamping forces are distributed evenly.

Another advantage of driving both the cable end portion and the spreaders is that heat created by friction due to the cable strands rubbing on the wall of the opening in the connector member, which provides areas of cold welding of the strands to the connector member. This further improves electrical conductivity.

In addition, the driving of the cable end portion together with the spreaders into the connector member equalizes the forces on each of the strands causing each of the outside cable strands to be pressed against the wall 28 and its neighbours with approximately the same force. This ensures a good mechanical connection between the cable and the connector member 12. The use of the elongated members to fill the interstices between strands prevents migration of the strands during the connection process and thereafter.

In addition, because this apparatus does not rely on a bolt for fastening the cable to the member, the problems with bolted clamp-type devices found in the prior art are eliminated.

Alternatives

Figures 8A, 8B, 9:
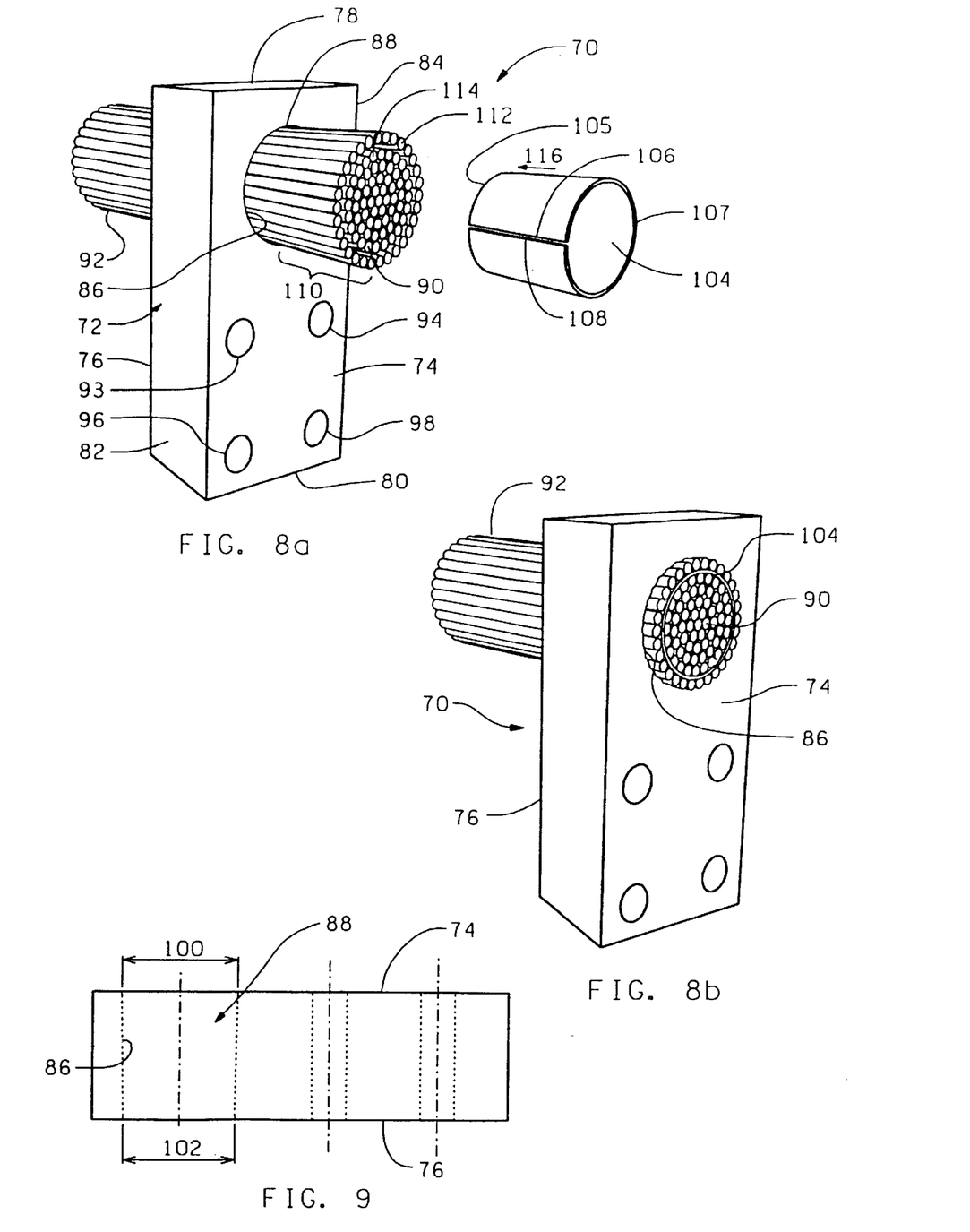
FIG. 8a is an oblique view of an apparatus according to a second embodiment of the invention, shown in operative relationship with a relatively large diameter stranded cable, ready for assembly.
FIG. 8b is an oblique view of the apparatus shown in FIG. 8, assembled.
FIG. 9 is a side view of a connector member according to the second embodiment of the invention.

Referring to FIG. 8*a*, an apparatus according to a second embodiment of the invention is shown generally at 70. The apparatus includes a connector member 72 having first and second major faces 74 and 76, first and second end faces 78 and 80 and first and second side faces 82 and 84. The member has a generally rectangular parallelepiped shape and is formed from a block of aluminum.

The member has a fourth tapered wall 86 defining an opening 88 through which a first end portion 90 of a multiple conductor stranded cable 92 is received. Connector member 72 also has first, second, third and fourth bolt openings 93, 94, 96 and 98 for receiving respective bolts (not shown) for securing the connector member 72 to an object.

Referring to FIG. 9, the fourth wall 86 is tapered such that the opening 88 has a first diameter 100 at the first major face 74 and has a second, smaller diameter 102 at the second major face 76. In this embodiment, the device is intended for use with a 2303kCM aluminum cable having 91 conductor strands. Therefore, the first diameter 100 is 46.6 mm while the second diameter 102 is 45.0 mm. When the connector block is used with aluminum cable, it is preferable that the taper of the opening 88 be between approximately 1 and 1.5 degrees.

Referring back to FIG. 8*a*, a spreader member 104 having a tapered annular ring form is shown. The spreader member 104 is formed from a sheet of aluminum rolled into the tapered form shown in FIG. 8*a*, such that opposite end portions 106 and 108 are abutting. The spreader member 104 has a taper complementary to the shape of the fourth wall 86 shown in FIG. 9 and has an inner edge 105 and an outer edge 107 which act as opposite edges thereof.

Operation

Referring to FIG. 8*a*, in use, the first end portion 90 of the cable is inserted into the connector member 72 from the second face 76 such that a relatively small portion 110, that is, about two diameters of the cable end portion extends past the first major face 74. The inner edge 105 of the spreader member 104 is then inserted between first and second outer cable strand layers 112 and 114 respectively. Thus, the spreader includes a generally annular member operable to be received between strands of the cable.

Figure 10:
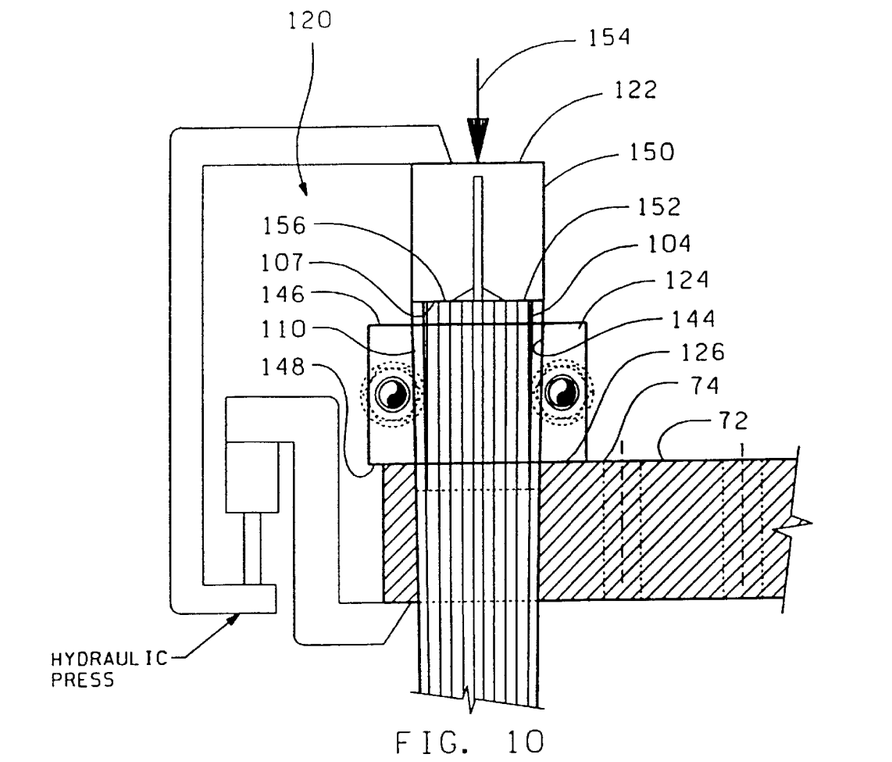
FIG. 10 is a cross-sectional view of the apparatus according to the second embodiment shown in conjunction with a press for pressing a spreader member thereof into an end portion of a cable.

Referring to FIG. 10, a press 120 is used in combination with a piston 122 and an insertion guide 124 to press the cable end portion 110 together with the spreader member 104 into connector member 72.

Figure 11:
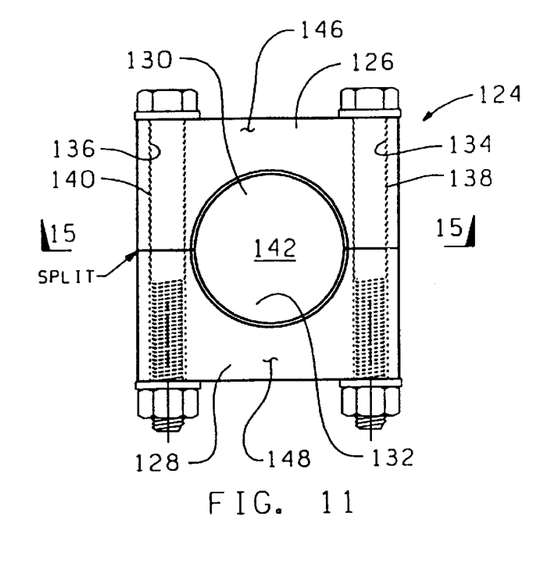
FIG. 11 is a plan view of an insertion guide for use with the apparatus according to the second embodiment of the invention.

Referring to FIG. 11, the insertion guide 124 is comprised of first and second half-portions 126 and 128 with first and second semicircular openings 130 and 132 respectively. The first and second half portions 126 and 128 have respective bores 134 and 136, through which first and second bolts 138 and 140 are received for securing the first and second half portions 126 and 128 together. The first and second half portions 126 and 128 are secured together such that the first and second semicircular openings 130 and 132 are facing each other to form a generally circular opening 142.

Figure 12:
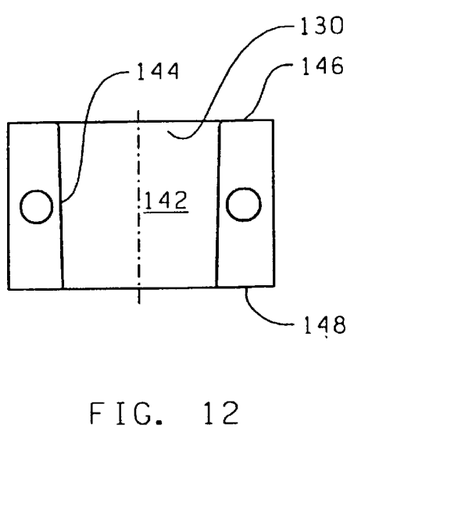
FIG. 12 is a side view of the insertion guide shown in FIG. 11.

Referring to FIG. 12, the first and second semicircular openings only one of which is shown at 130 are shaped such that the generally circular opening 142 has a tapered wall 144 with an approximately 1–2 degree taper.

Referring back to FIGS. 10 and 11, the first and second half portions 126 and 128 have respective flat surfaces 146 and 148 which facilitate stable placement of the insertion guide 124 on the connector member 72, as shown in FIG. 10. The insertion guide 124 is placed on the connector member 72 such that the tapered wall 144 is tapered in a direction toward the connector member 72. In use, the insertion guide 124 is placed about the cable end portion extending beyond the connector member. The first and second half portions 126 and 128 are separated and reconnected using the first and second bolts 138 and 140, to facilitate easy placement of the insertion guide 124 about the cable end portion.

The piston 122 has a right circular cylindrical outer surface 150 and has an annular flat surface 152 extending at right angles to the outer surface 150. The annular flat surface 152 is operable to contact the outer edge 107 of the spreader member 104.

Figure 13:
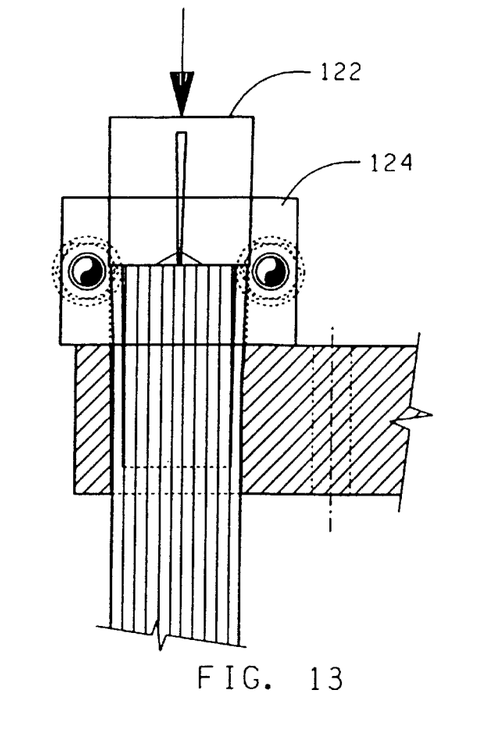
FIG. 13 is a cross-sectional view of the apparatus according to the second embodiment shown with a piston connected to the press in an intermediate position.

Force is applied to the piston 122, using the press 120, to drive the piston 122 in the direction of arrow 154, relative to the connector member. The press 120 thus urges the piston 122 on the spreader member 104, to apply an axial force to the cable end portion and the spreader member, in the direction of arrow 154, which pushes the cable end portion down into the insertion guide 124 as shown in FIG. 13. Thus, the cable end portion and the spreader member are forced into the opening with a press.

Figure 14:
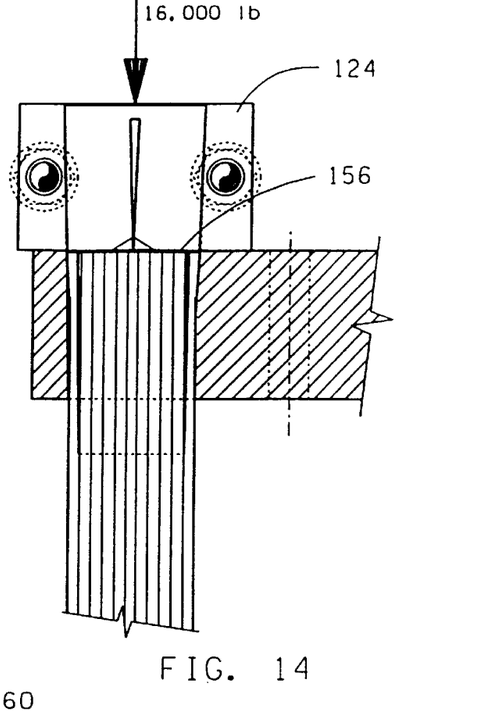
FIG. 14 is a cross-sectional view of the apparatus according to the second embodiment shown with the piston of FIG. 13 in a final position.

The press 120 has a limited range of movement such that force is applied to the piston 122 until an end face 156 of the cable end portion is generally coplanar with the first major face 74 of the connector member 72, as shown in FIG. 14.

Referring to FIG. 8b, cooperating with the tapered wall portion 86 of the connector member 72, the spreader member 104 acts as a wedge to hold the cable end portion in place. The cable end portion and spreader member 104 are thus pressed in the direction of arrow 116, parallel to the axis of the opening such that the cable strands of the outer layer 112 are forced against the fourth wall 86, until plastic deformation of the outer layer 112 occurs. This tightly secures the first end portion 90 to the connector member 72, with the advantages of the invention as described in connection with the apparatus according to the first embodiment. FIG. 8b shows the completed or assembled connection formed in this manner. Placement of the annular member between the first and second outer layers of strands maximizes contact pressure between the cable and the wall of the opening.

It has been found that the spreader member 104 need not be rolled into a tapered form but rather is equally effective if made in a non-tapered or cylindrical form. Thus, the spreader member may alternatively include an annular member including a tubular member operable to be received between first and second outer layers of strands of the cable.

Figure 15:
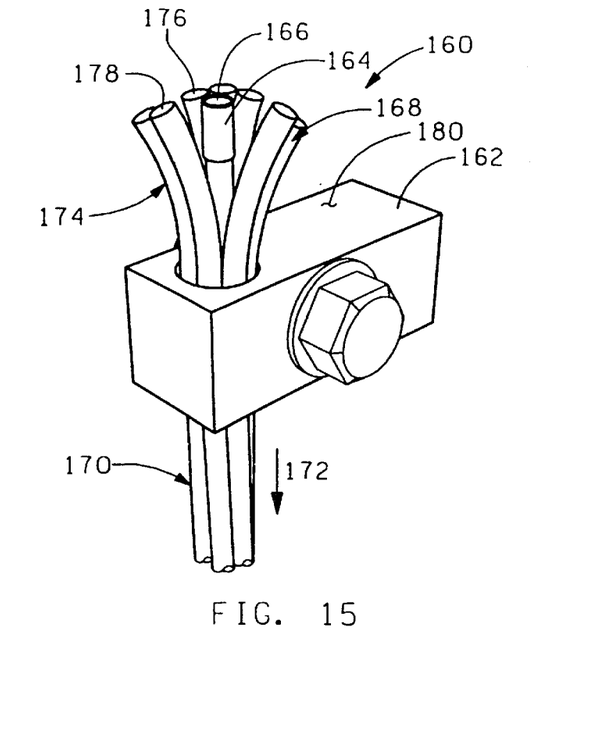
FIG. 15 is an oblique view of an apparatus according to a third embodiment of the invention.

Referring to FIG. 15, an apparatus according to a third embodiment of the invention is shown generally at 160. The apparatus includes a connector member 162 as disclosed in connection with the apparatus according to the first embodiment of the invention, however, the spreader member in this embodiment includes an annular member in the form of a copper tube 164 or ferrule operable to snugly receive a single cable strand 166 therethrough. Thus the annular member includes a tubular member operable to be received on at least one strand of the cable.

In this embodiment, the cable is a 4/0 7-strand bare copper cable and the copper tube 164 measures approximately ½ inch in length, has a thickness of about ¹⁄₁₆ inches and has an inside diameter approximately equal to the outside diameter of a single 4/0 conductor. Again, in this embodiment, it is desirable to select the length, diameter and wall thickness of the copper tube 164 such that the total volume occupied by the material of the tube is approximately 5 percent to approximately 10 percent greater than the difference in volume between the volume defined by the opening 142 and the volume of the cable material within the opening.

As seen in FIG. 15, the copper tube 164 is placed on the centre conductor 166 of a small diameter multi-stranded cable, with surrounding conductors 168 splayed outwardly just enough to allow the copper tube 164 to be received on the centre conductor.

A main portion 170 of the cable is then pulled away from the connector member 162 in the direction of arrow 172 until the cable end portion 174 can no longer be pulled through the connector member. A hammer, (not shown) is then used to strike the cable end portion to drive it together with the copper tube 164 into the connector member 162 generally until end faces 176, 178, etc. of the cable strands are coplanar a the first major face 180 of the connector member 162.

Figure 16:
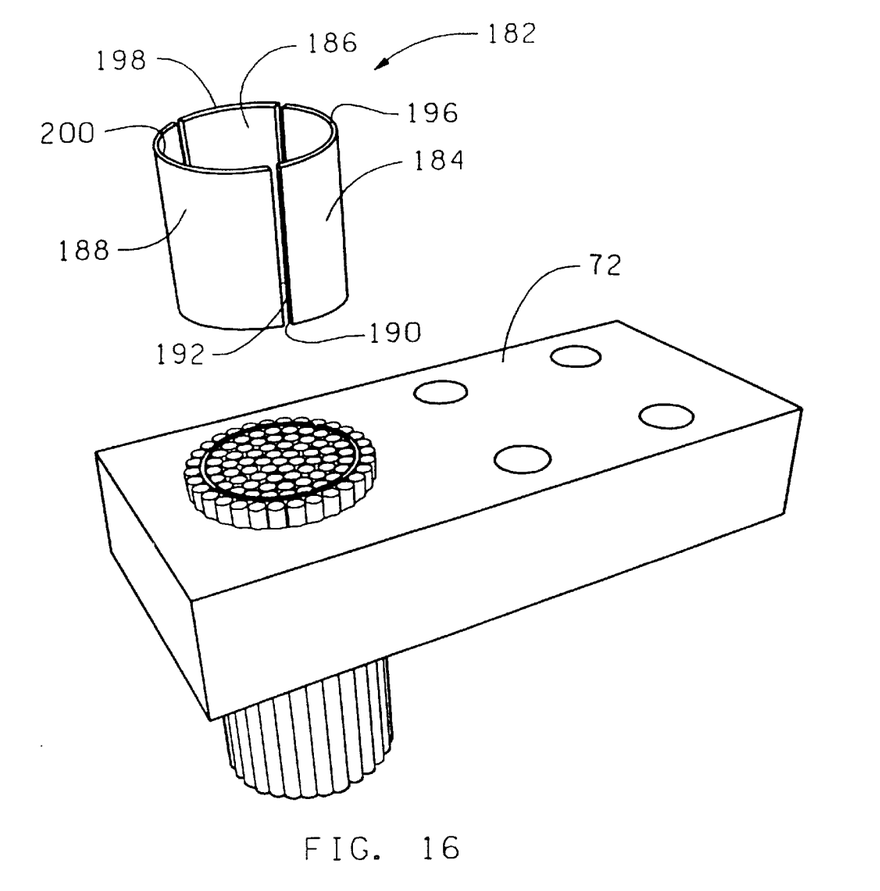
FIG. 16 is an oblique view of an apparatus according to a fourth embodiment of the invention.

Referring to FIG. 16, an apparatus according to a fourth embodiment of the invention is shown generally at 182. The apparatus includes a connector member 72 as shown in connection with the apparatus shown in FIGS. 8a and 8b and differs in that the spreader member 104 shown in FIGS. 8a and 8b is replaced with first, second and third concentric circular arcuate segments 184, 186 and 188, operable to be received between first and second outer layers of strands of the cable.

Each of these segments extends through an arc of approximately 120 degrees and has opposing mating edges, two of which are shown at 190 and 192 respectively which are operable to abut each other to form to a cylindrical ring.

Figure 17:
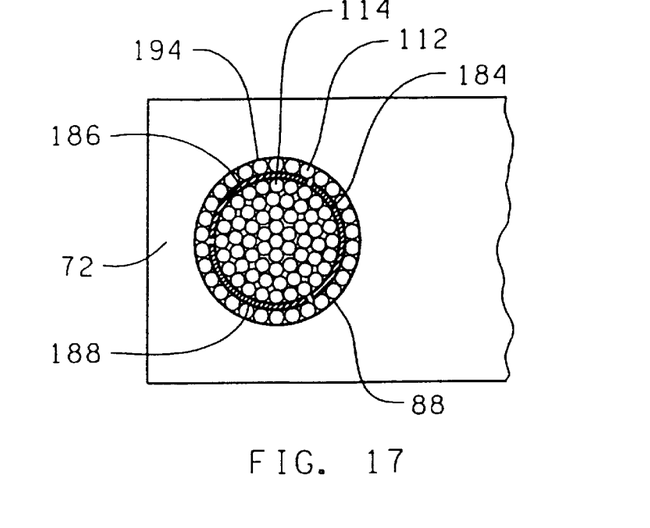
FIG. 17 is an end view of the apparatus according to the fourth embodiment of the invention.

Referring to FIG. 17, an advantage of this embodiment is that the cable end portion shown generally at 194 may be inserted through the tapered opening 88 in the connector member 72 and the individual segments 184, 186 and 188 may be individually placed between the first and second outer layers 112 and 114 of cable strands and the cable end portion and spreaders pressed into the tapered opening 88 in the connector member 72 using the press as described and shown in FIG. 10 through 14. Thus, the individual segments also act as spreader members. Again, the dimensions of the individual segments in this embodiment are selected such that the total volume occupied by the segments is between approximately 5 percent and approximately 10 percent greater than the difference in volume defined by the opening 30 and the volume occupied by the cable material within the opening.

The cable connector and connection method according to the invention provides an easy way of forming electrical connections in stranded cables, with improved clamping characteristics, improved electrical characteristics and improved long term performance. For small diameter cables, the connection method can be carried out quite simply in the field, using only a hammer. For Large diameter cables, the connection method can be carried out with the use of a simple press. Connections made according to the method disclosed herein can easily be inspected from an electrically safe distance, by looking for loosening of the cable relative to the connector member in an end view of the connection.

While specific embodiments of the invention have been described and illustrated, such embodiments should be considered illustrative of the invention only and not as limiting the invention as construed in accordance with the accompanying claims.

What is claimed is:

1. A connector apparatus for securing a stranded cable to an object, the apparatus comprising:

a) a member operable to be secured to an object, said member having a wall defining an opening for receiving a first end portion of the cable, said opening defining a connector opening volume and a portion of said first end portion of the cable within said opening defining a cable volume, a difference between the connector opening volume and the cable volume being defined as a difference volume;

b) a plurality of elongated members, each of said elongated members having a tapered wedge portion operable to be received in a respective interstice between strands of the cable, said elongated members defining a spreader volume, said elongated members being dimensioned such that said spreader volume is between approximately 5 percent and approximately 10 percent greater than said difference volume, said elongated members being formed of a material operable to plastically deform when forced into said opening with said first end portion of said cable, said elongated members being dimensioned to spread at least some of the strands until at least some of the strands are plastically deformed against said wall as said first end portion and said elongated members are forced into said opening.

2. A connector apparatus as claimed in claim 1, wherein said wall defining said opening has a tapered wall portion.

3. A connector apparatus as claimed in claim 2, wherein said tapered wedge portion has a taper complementary to said tapered wall portion.

4. A connector apparatus for securing a stranded cable to an object, the apparatus comprising:

a) a member operable to be secured to an object, said member having a wall defining an opening for receiving a first end portion of the cable, said opening defining a connector opening volume and a portion of said first end portion of the cable within said opening defining a cable volume, a difference between the connector opening volume and the cable volume being defined as a difference volume;

b) a plurality of arcuate members operable to be received between first and second outer layers of strands of the cable, said arcuate members defining a spreader volume, said arcuate members being dimensioned such that said spreader volume is between approximately 5 percent and approximately 10 percent greater than said difference volume, said arcuate members being formed of a material operable to plastically deform when forced into said opening with said first end portion of said cable, said arcuate members being dimensioned to spread at least some of the strands until at least some of the strands are plastically deformed against said wall as said first end portion and said arcuate members are forced into said opening.

5. A connector apparatus as claimed in claim 4, wherein said wall defining said opening has a tapered wall portion.

6. A connector apparatus as claimed in claim 5, wherein said arcuate members have a taper complementary to said tapered wall portion.

7. A method for securing a stranded cable to a member, the method comprising the steps of:

a) passing a first end portion of the cable through an opening defined by a wall of the member, by moving said first end portion in a direction toward a connector member; and b) placing a plurality of elongated spreader members formed of a material operable to plastically deform, in respective interstices between strands of and generally parallel to the axis of said cable to spread apart at least some of the strands of the cable;

c) forcing into said opening said cable end portion and said spreader members, until said spreader members and at least some of said cable strands are plastically deformed.

8. A method as claimed in claim 7, wherein the step of forcing includes the step of forcing said cable end portion and said spreader member into said opening in a direction opposite to the direction in which said cable end portion is passed through said opening.

9. A method as claimed in claim 7, wherein the step of forcing includes the step of pressing said cable end portion and said spreader member with a press.

* * * * *